J. W. MORGAN.
DUST PROOF LUBRICATION FOR DISK BEARINGS.
APPLICATION FILED NOV. 2, 1915.
1,188,552.
Patented June 27, 1916.
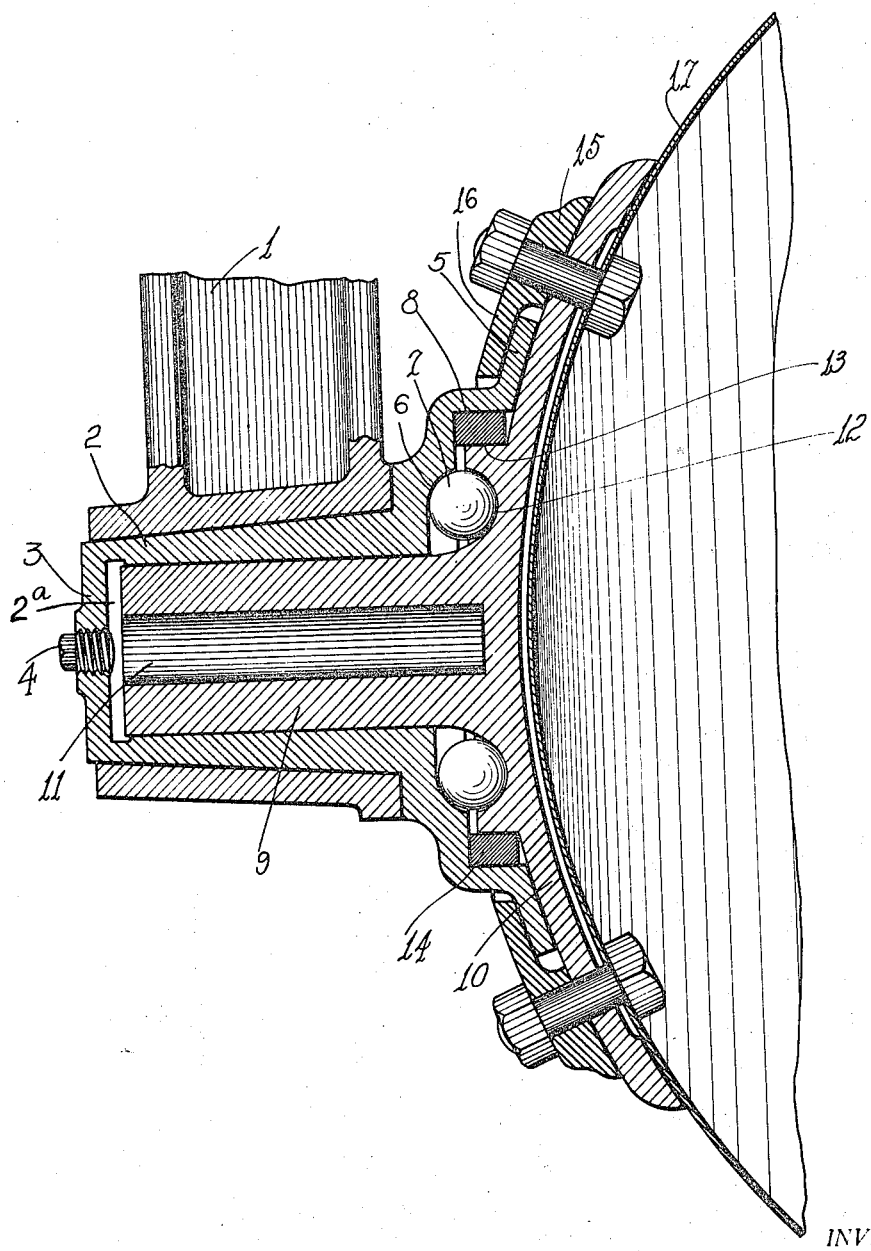
WITNESS.
Floyd M. Blanchard
INVENTOR.
John W. Morgan
BY
ATTORNEY.

UNITED STATES PATENT OFFICE.

JOHN W. MORGAN, OF MARYSVILLE, CALIFORNIA.

DUST-PROOF LUBRICATION FOR DISK BEARINGS.

1,188,552.     Specification of Letters Patent.     Patented June 27, 1916.

Application filed November 2, 1915. Serial No. 59,195.

*To all whom it may concern:*

Be it known that I, JOHN W. MORGAN, a citizen of the United States, residing at Marysville, in the county of Yuba, State of California, have invented certain new and useful Improvements in Dust-Proof Lubrication for Disk Bearings; and I do declare the following to be a full, clear, and exact description of the same, reference being had to the accompanying drawings, and to the characters of reference marked thereon, which form a part of this application.

This invention relates to improvements in the bearings for disk harrows and plows, the object of the invention being to produce a bearing for each individual disk flange which can be kept well lubricated and free from dust and dirt.

A further object of the invention is to produce a simple and inexpensive device and yet one which will be exceedingly effective for the purposes for which it is designed.

These objects I accomplish by means of such structure and relative arrangement of the parts as will fully appear by a perusal of the following specification and claims.

The figure of the drawings is a sectional view of the complete bearing showing my improved lubricating means therefor.

Referring now more particularly to the characters of reference on the drawings, the numeral 1 designates a bracket or holder into which the disk bearing or hub 2 is secured in any suitable manner. This member 2 is closed at its outer end, as at 3, such closure being provided with a removable threaded plug 4.

On the opposite end of the member 2 is a projecting flange 5 provided, first, with an annular bore 6 forming a seat for ball bearings 7. The said flange 5 is then provided with a square bore 8 from which projects the remaining portion of the flange.

The numeral 9 designates the spindle on the disk flange 10, which spindle is provided with a central bore 11 having its open end adjacent the removable plug 4. The inner face of the flange 10 is provided with an annular groove 12 adapted to receive the balls 7, while the numeral 13 designates a shoulder adapted to project within the bore 8 leaving an intermediate space for the reception of a fiber or other suitable packing washer 14.

The numeral 15 designates the retainer bolted to the flange 10 and having an overhanging flange 16 projecting over the flange 5 to hold the disk flange 10 in position so as to maintain the spindle 9 in the bearing 2. The disk 17 is secured to the flange 10 in a suitable manner.

The diameter of the bore of the bearing 2 at its inner end is slightly enlarged and the spindle 9 does not fit closely against the inner end of the bearing but projects only a slight distance into the enlarged end of the bore of such bearing to form a recess $2^a$.

As will be noted the main frictional bearing for the disk is between the spindle 9 and the bearing 2 and against the balls 7. The packing 14 prevents dust and dirt from reaching these parts, and to lubricate them I remove the plug 4 and force the recess $2^a$ and the bore 11 full of grease. These parts hold a sufficient amount of grease to lubricate the ball bearings and spindle for a considerable length of time, and the washer 14, as noted, keeps the bearings free from dust and dirt.

The recess $2^a$ being of a greater diameter than the bore of the bearing 2 and consequently greater than the diameter of the spindle 9, and the end of the spindle 9 projecting slightly into the recess $2^a$, this permits of the grease being applied directly to the said spindle 9 the revolution of which within the bearing 2 works the grease toward the front end of the bearing. Any grease which may work past the bearing 14 will also tend to prevent friction between the flanges 10, 16 and 5. However, the main object of the inventiton is to so design the device that the packed joint will be entirely dust, dirt, sand and even air proof. The pressure of the bearings against the packing washer tends to expand the same to make it tighter. In some very severe tests in very fine deep sand I have discovered that the packing excludes the same to such a degree that not even a grain of sand enters the bearings. As a matter of fact, the bearings are substantially air tight, since to pull the spindle out of the hub it is necessary to previously remove the plug 4 to allow the entrance of air into the hub. These instances are given to illustrate the air tight joint as provided by the special design described.

From the foregoing description it will be readily seen that I have produced such a device as substantially fulfils the objects of the invention as set forth herein.

While this specification sets forth in detail the present and preferred construction of the device, still in practice such deviations may be resorted to as do not form a departure from the spirit of the invention, as defined by the appended claims.

Having thus described my invention what I claim as new and useful and desire to secure by Letters Patent is:

1. The combination of a bearing closed at one end and having a removable plug, a projecting flange on the bearing provided with an annular bore, a disk flange having a spindle projecting into said bearing, such disk flange bearing against the outer ends of the first named flange and provided with a shoulder projecting into said annular bore in spaced relation, a packing between the shoulder and the sides of the annular bore, and a retainer secured to the disk flange and overhanging the first named flange, as described.

2. The combination of a bearing closed at one end and having a removable plug, a projecting flange on the bearing provided with an annular bore, a disk flange having a spindle projecting into said bearing, such spindle being provided with a central bore, said disk flange bearing against the outer ends of the first named flange and provided with a shoulder projecting into said annular bore in spaced relation, a packing between the shoulder and the sides of the annular bore, and a retainer secured to the disk flange and overhanging the first named flange, as described.

In testimony whereof I affix my signature.

JOHN W. MORGAN.